United States Patent
Otto et al.

(10) Patent No.: US 6,281,927 B1
(45) Date of Patent: Aug. 28, 2001

(54) ROTATING SHUTTER SYSTEM FOR HOSTILE LASER SOURCE LOCATION TECHNIQUE

(75) Inventors: William F. Otto, Huntsville; Vernon H. Ayre, Falkville; John K. Dempsey, Union Grove; Richard D. Milton, Lacey Spring, all of AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 07/253,099

(22) Filed: Sep. 26, 1988

(51) Int. Cl.$^7$ .............................. H04N 3/00; G02B 26/02
(52) U.S. Cl. .......................... 348/61; 359/235; 359/601
(58) Field of Search ................................. 350/271, 273, 350/274, 6.9; 250/233; 89/1.11; 359/235, 68; 348/61

(56) References Cited

U.S. PATENT DOCUMENTS

| | | | |
|---|---|---|---|
| 2,494,440 | * 1/1950 | Haynes | 350/274 |
| 3,138,712 | * 6/1964 | Aroyan | 350/274 |
| 3,178,992 | * 4/1965 | Murphy et al. | 350/274 |
| 3,610,936 | * 10/1971 | Fried | 350/274 |
| 3,807,659 | * 4/1974 | Winfrey | 350/273 |

* cited by examiner

Primary Examiner—Michael J. Carone
(74) Attorney, Agent, or Firm—Arthur H. Tischer; Freddie M. Bush

(57) ABSTRACT

A hostile laser source location technique employs a television camera in conjunction with a rotating shutter to pinpoint the location of a hostile laser source without placing the pilot/operator at risk for eye damage. For an attack scenario the pilot/operator could then make changes in his tactics to negate the source or to continue his attack run. The shutter made of high optical density material (e.g., OD-4), except for an open aperture, provides optics protection for the camera system from both damage and dazzle. A detector is used to detect the laser pulse (flash) which immediately signals the proper frame to be frozen on a monitor. The laser source appears as a bright spot and is easily pinpointed.

2 Claims, 1 Drawing Sheet

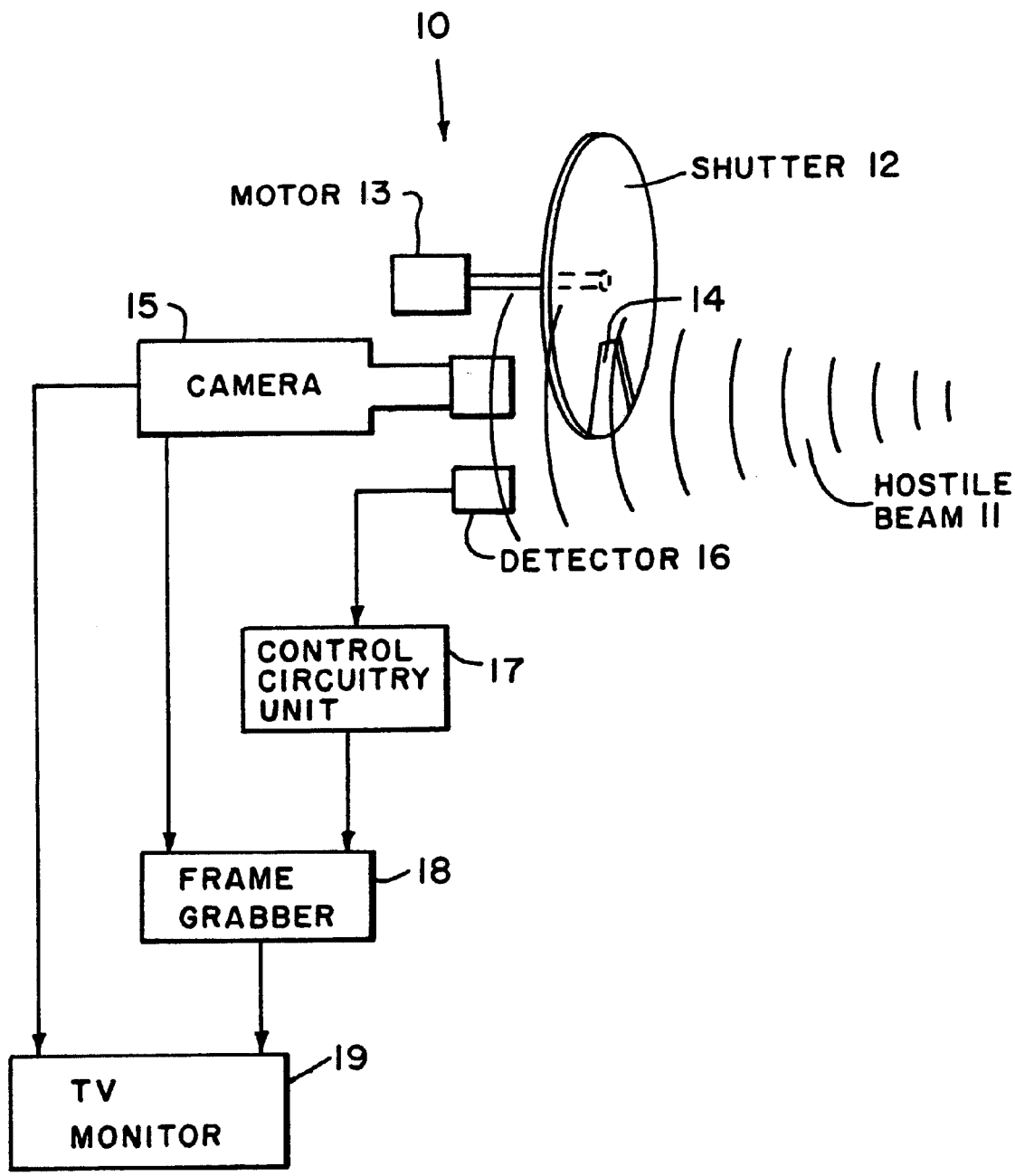

ROTATING SHUTTER SYSTEM FOR HOSTILE LASER SOURCE LOCATION TECHNIQUE

CROSS-REFERENCE TO RELATED APPLICATION

The rotating shutter system disclosed in combination with this invention for hostile laser source location technique is disclosed in our concurrently filed U.S. patent application titled: "Rotating Shutter System for Eye/Optics Protection Against In-Band Frequency Agile Lasers", Ser. No.: 07/253,100, Filed: Sep. 26, 1988.

DEDICATORY CLAUSE

The invention described herein may be manufactured, used, and licensed by or for the Government for governmental purposes without the payment to us of any royalties thereon.

BACKGROUND OF THE INVENTION

Optical filters have been designed that attenuate sufficiently at a particular wavelength thus leaving the rest of the visible spectrum open. Since the use of filters greater than optical density-2 (OD-2) limits the performance of pilot/operator in bright sunlight conditions, it follows that the use of OD-2 filters in a low ambient light scenario would likewise limit the performance for non-instrumental surveillance at the latter conditions. Bright light in the visible region, (e.g., wavelength from about 397 micrometers or microns to about 723 micrometers or microns) and to the infrared region to the limit of perception of human eye (which is about 100 microns or 100 micrometers), emitting from a point source relates to radiation of a different nature than that which is emitting from a wide spectrum electromagnetic radiation source extending in many directions. Radiation from a point source such as radiation from a frequency agile laser is the subject matter which is covered in greater detail hereinbelow.

Laser radiation particularly in the visible region has always presented a potential hazard to the human eye. More recently this potential has been under exploitation by military organizations both foreign and domestic. The human eye focuses light in the visible region which greatly increases the intensity of light on the retina from that striking the cornea and the lens.

Certain laser beams are 10,000 times brighter so that the sun's rays, and much more hazardous. When a beam of laser radiation is absorbed by living tissue, the extent of damage caused is dependent on several things: the energy level of the radiation, the type of tissue irradiated, and the wavelength of the laser radiation, and the time of exposure to the radiation.

Intense laser-energy when absorbed by the body is converted into heat. This heat coagulates the protein in the body's tissues (in a similar manner when boiling water coagulates egg albumin) and destroys the cells.

The human eye is the most vulnerable tissue to all types of laser radiation. The tissue in the retina (that portion of the eye upon which the light or image is focused, and specifically the fovea of the retina) is particularly susceptible to damage because the lens of the eyeball concentrates and focuses the laser beam on the fovea of the retina.

The interaction of a laser beam with eyeball tissue as received by the cornea and focused by the lens on the fovea of the retina is described as follows:

1. As the laser beam impinges on the eyeball, part of the beam is prevented from entering the eye by the iris, a colored disc behind the cornea (the outwardly convex transparent membrane forming part of the anterior outer coat of the eye); the iris acts like an automatic photographic shutter and constricts when high-intensity light impinges on the eye;
2. The shutter action of the iris prevents part of the light from reaching the retina;
3. The part of light which reaches the retina also effects a thin, dark-brown choroid membrane containing arteries, veins, and pigment cells which surrounds the retina, and since this membrane is dark colored and can easily absorb radiation, it must therefore be protected;
4. The laser beam is converged and focused on the fovea of the retina by the lens; and,
5. As projected from laser-welding principles we know that the focus is the hottest point, therefore, the laser-energy density at the fovea is about $10^4$ to $10^6$ times more concentrated than that received by the cornea and the lens. Hence, it is recognized why eye damage can occur due to this magnitude of light concentration.

As concluded from the above described interactions, it is recognized why eye damage can occur due to this magnitude.

Since the laser used as a weapon against the human eye, eyes behind optics, and optics themselves is considered a threat to U.S. forces, scientists have looked hard at contermeasure techniques. Protective goggles or glasses have been the only real product of research efforts. The bulk of the work has been in the types of lenses/filters to go in this eyewear.

Filters have been designed that attenuate sufficiently at a particular wavelength thus leaving the rest of the visible spectrum open. This is a real advantage to the pilots or operators in performing their tasks. With the advent of frequency agile lasers however, it has become necessary to filter over the entire visible region. This presents a real handicap to the operators in performing their tasks particularly in a low ambient light scenario.

Designing a filter in the form of goggles which filter over the entire visible region is not a practical approach. Another name for goggles which filter the complete visible spectrum is blindfolds. Thus, the limitation to an operator's performance is recognized, and it follows that instrument flight conditions would then be required; however, the ability to locate and pinpoint a source of light would be lost. Since OD-2 goggles pass $1/100$th of the light that strikes them which means that the agile laser threat could increase laser output by 100 times and thus negate the filters. Finally, the goggles allow for exposure of both eyes simultaneously. It follows that another approach is desired since complete protection of both eyes from a first laser pulse does not appear possible. Therefore, scientists had at this point in time overlooked an approach for protection from the first laser pulse but concentrated efforts towards providing protection from the second and subsequent laser pulses. The probability however, is in the operators favor of not being damaged by the first laser pulse in that he will not be looking directly at the laser source when the first pulse arrives or that the first pulse will be off target but still detectable. This scheme also protects the operator from instinctively looking towards the source when the next pulse arrives. Applicants' cross-referenced, concurrently filed application is designed with the emphasis to operator's eye protection. Protection of optics from damaging laser flashes is a desirable feature which is described below and which also prevents eye damage in location technique.

The invention described hereinbelow provides optics protection while providing a technique to pinpoint the location of a hostile laser source. A system which provides protection from laser pulses including the first one while also avoiding the risk of damage to optics is a desirable enovation. The operator will also suffer no degradation of his performance due to insufficient light required if the optics (camera) employed to pinpoint the hostile laser source location is provided protection.

An object of this invention is to provide a technique to pinpoint the location of a hostile laser source without placing the operator at risk for eye damage.

Another object of this invention is to provide a technique to pinpoint the location of a hostile laser source which offers protection to the optics employed in the technique.

Still a further object of this invention is to additionally provide a detector for a laser pulse (flash) which immediately causes the detected laser pulse to be frozen on a monitor whereby the laser source appears as a bright spot which is easily pinpointed.

SUMMARY OF THE INVENTION

A method of locating a hostile laser source which employs a television camera system in combination with a rotating shutter which provides optics protection for the camera system from both damage and dazzle. The rotating shutter is made of high optical density material (e.g., OD-4 material), except for an open aperature which permits the light sensitive portion of the optics of the camera system to receive a view of the vicinity without being exposed to a hostle laser beam. A multi-directional detector is used to detect a first laser pulse (flash) which immediately signals the proper frame to be frozen on a TV monitor, and the exact location is easily pinpointed.

The rotating shutter system comprises a rotatable shutter having an open sector which is rotated at a predetermined rate in front of a TV camera to prevent flickering or dazzling of the field of view. The shutter is mounted to variable speed motor which controls the rate of rotation of the shutter and the open sector. A TV camera is mounted in a fixed relationship to the open sector of the rotating shutter. In operation, the TV camera and rotatable shutter system is in combination with a detector system for laser pulses over the visible range from the far infrared through to the near infrared. The detector system is in electrical communication with a control circuit, a frame grabber, TV camera, and TV monitor as illustrated in the Drawing and as described hereinabove to complete the desired functions.

BRIEF DESCRIPTION OF THE DRAWING

The FIGURE of the Drawing is a diagrammatic sketch of the method of the invention for locating a hostile laser source without placing a operator at risk for eye damage.

DESCRIPTION OF THE PREFERRED EMBODIMENT

The method of locating a hostile laser source without placing the operator at risk for eye damage employs a detector system in electrical communication with a TV camera, control circuitry, frame grabber, and TV monitor. A rotating shutter system provides the TV camera system with a view of the vicinity while lessening the chances of exposing is the TV camera system to a hostile laser beam. The view obtained by the TV camera in this manner enables the first laser pulse (flash) to be recorded in the form of a proper frame which is frozen on a TV monitor. The laser source appears in the proper frame as a bright spot and is easily pinpointed in the frozen frame.

In further reference to the FIGURE of the Drawing, the method of locating a hostile laser source 10 is depicted in diagrammatic form. A hostile beam 11 is depicted as radiating toward a rotatable shutter 12 which is rotatable at a predetermined speed by motor 13. The shutter is constructed of a major portion of an opaque or high density material (e.g., OD-4) with an open sector 14 or aperture which permits TV camera 15 to receive a view of the vicinity of hostile beam while being provided protection from damage or dazzle. The rate of rotation of the illustrated disk of 48 times per second or 2880 RPM for a single open sector enables the camera to transmit a picture without flicker while sufficient to obtain picture and protecting the camera system from laser damage. By adding a second open sector, the speed of the motor can be reduced by one-half.

In further describing the invention while it is in service, while referring to the Drawing, the hostile laser pulse 11 irradiates both a detector 16 and the shutter 12 (with 10 open sector 14) which is rotated by a motor 13. The output of the detector 16 is sent to the control circuitry unit 17. The function of control circuit 17 may be accomplished by a simple threshold detector. If the signal exceeds a preset threshold the control circuitry unit 17 triggers a sample and hold circuit (frame grabber) 18 which freezes the frame of incidence and displays it on the TV monitor 19. Prior to this, the camera 15 had been continuously displaying the scene (in its field of view) on the TV monitor 19. By the laws of probability the camera 15 is looking through OD-4 material at the time of the hostile laser pulse 11; but, subsequently without damage to the light sensitive portion of the camera, the camera displays the laser pulse which is then easily pinpointed as a bright spot in the frozen scene. If the operator chooses to negate the source he can switch back to live video and utilize it in making his approach to this target. The pilot would probably not be able to utilize this technique for the entire approach. He would however, eliminate the risk to his eyes (inherent in protective eyewear) while utilizing this camera system to approach the target rather than by direct use of his eyes.

We claim:

1. A detection system for locating a hostile laser source while eliminating the risk to an operator's eyes and while protecting the optics employed in said detection system, said detection system comprising:
   (i) a rotating shutter system as defined under A set forth below for protecting the optic and detector portion of said detection system; and
   (ii) an optics and television monitoring system as defined under B set forth below, said rotating shutter system comprising:
A. (i) a rotatable shutter member constructed of a major portion of a high optical density material and a minor portion of a low density optical material, said rotatable shutter having a predetermined number of said low optical density sectors arranged in a predetermined position around the periphery of said rotatable shutter member for passing in front of optics to thereby allow sufficient ambient light to reach the light sensitive portion of said optics to retain said acuity and to retain ability to locate said laser source;
   (ii) mounting means for securing said rotatable shutter to permit rotational operation at a predetermined rate of rotation; and,
   (iii) a variable speed electrically operated motor for removeably mounting to said mounting means for said rotatable shutter for spinning said rotatable shutter in front of a television camera and a lens portion thereof; said optics and television monitoring system comprising:

B. (i) a detector for receiving laser radiation;

(ii) a television camera positioned with the lens portion behind said rotating shutter as defined under A above and said television camera being electrically linked to a television monitor and a frame grabber for freezing a selected frame on said television monitor, said frame grabber being additionally electrically linked with a control circuitry unit for receiving output of said detector;

(iii) a control circuitry unit for receiving output from said detector, said control circuitry unit when receiving a preset threshold level of radiation having the capability of triggering a frame grabber which freezes a frame and displays said frozen frame on a television monitor;

(iv) a frame grabber electrically linked to said control circuitry unit for receiving a signal when a preset threshold signal level is exceeded, said frame grabber electrically linked to said television camera which continuously displays a scene of a potential laser radiation source and said frame grabber having the capability to display a frozen frame on said television monitor so that a laser pulse is easily pinpointed as a bright spot in said frozen frame; and, (v) a television monitor electrically linked to said television camera and said frame grabber for performing continuous monitoring of a television picture and for displaying a frozen frame as received from said television camera and as frozen by said frame grabber and said television monitor.

2. The detection system for locating a hostile laser source as set forth in claim 1 wherein said rotating shutter is in the form of a disk which rotates at a predetermined rate of about 48 times per second or about 2880 revolutions per minute to avoid a flickering image.

* * * * *